United States Patent
Li et al.

(10) Patent No.: US 11,651,772 B2
(45) Date of Patent: *May 16, 2023

(54) NARROWBAND DIRECTION OF ARRIVAL FOR FULL BAND BEAMFORMER

(71) Applicant: DSP Concepts, Inc., Santa Clara, CA (US)

(72) Inventors: Ke Li, San Jose, CA (US); Paul Beckmann, Sunnyvale, CA (US)

(73) Assignee: DSP Concepts, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/587,458

(22) Filed: Jan. 28, 2022

(65) Prior Publication Data

US 2022/0223149 A1 Jul. 14, 2022

Related U.S. Application Data

(63) Continuation of application No. 16/290,547, filed on Mar. 1, 2019, now Pat. No. 11,276,397.

(51) Int. Cl.
*G10L 15/22* (2006.01)
*G10L 15/28* (2013.01)

(52) U.S. Cl.
CPC .............. *G10L 15/22* (2013.01); *G10L 15/28* (2013.01)

(58) Field of Classification Search
USPC .......................... 704/246, 247, 251, 252, 275
See application file for complete search history.

(56) References Cited

U.S. PATENT DOCUMENTS

| 7,668,710 B2 | 2/2010 | Doyle |
| 9,335,966 B2 | 5/2016 | Bansal et al. |

(Continued)

FOREIGN PATENT DOCUMENTS

WO 2022155135 7/2022

OTHER PUBLICATIONS

Davis, "Statistical Voice Activity Detection Using Low-Variance Spectrum Estimation and an Adaptive Threshhold", IEEE Transactions on Audio, Speech and Language Processing; vol. 14:2, (Mar. 2006).

(Continued)

*Primary Examiner* — Leonard St. Cyr
(74) *Attorney, Agent, or Firm* — Schwegman Lundberg & Woessner, P.A.

(57) ABSTRACT

A system and method for improving the performance of a hands-free voice user interface system while minimizing the computational complexity without sacrificing performance. Specifically, when estimating the location of the talker for the purpose of steering a directional beam in the direction of the active talker. A hands-free voice user interface system requires a clean signal to be streamed to the cloud for recognition. One way to improve the speech signal is to estimate where the talker is and steer a beam in the direction of the active talker. To locate the talker to a localized position, a direction of arrival estimator (DOA) algorithm is used. DoA generally requires noise and echo free signal for optimal estimation, but it is computationally expensive to run audio pre-processing such as an acoustic echo cancellation for each microphone in microphone array. To reduce computational complexity, the system and method extract certain range of frequency and operate pre-processing only on the selected frequency. By properly selecting the fre- (Continued)

quency range, it does not degrade DoA accuracy while significantly reducing computational complexity.

17 Claims, 4 Drawing Sheets

(56) References Cited

U.S. PATENT DOCUMENTS

| | | | |
|---|---|---|---|
| 9,418,651 | B2 | 8/2016 | Clark et al. |
| 9,443,508 | B2 | 9/2016 | Tan |
| 9,653,060 | B1 | 5/2017 | Hilmes et al. |
| 10,079,026 | B1* | 9/2018 | Ebenezer ............ G10K 11/175 |
| 10,304,475 | B1 | 5/2019 | Wang et al. |
| 10,499,139 | B2 | 12/2019 | Ganeshkumar |
| 11,276,397 | B2 | 3/2022 | Li et al. |
| 11,523,215 | B2 | 12/2022 | Ramanthan et al. |
| 2009/0022336 | A1 | 1/2009 | Visser et al. |
| 2011/0178798 | A1 | 7/2011 | Flaks et al. |
| 2011/0301954 | A1 | 12/2011 | Sims et al. |
| 2014/0003611 | A1 | 1/2014 | Mohammad et al. |
| 2014/0278389 | A1 | 9/2014 | Zurek et al. |
| 2016/0077794 | A1 | 3/2016 | Kim et al. |
| 2017/0033899 | A1 | 2/2017 | Rakib et al. |
| 2017/0103774 | A1 | 4/2017 | Sørensen |
| 2018/0146319 | A1 | 5/2018 | Benattar |
| 2018/0270565 | A1 | 9/2018 | Ganeshkumar |
| 2018/0330745 | A1* | 11/2018 | Ebenezer ............ H04R 3/005 |
| 2019/0052957 | A1* | 2/2019 | Zernicki ............ H04R 3/005 |
| 2019/0342660 | A1* | 11/2019 | Janse ............ H04R 1/406 |
| 2020/0279557 | A1 | 9/2020 | Li et al. |
| 2022/0225024 | A1 | 7/2022 | Ramanthan et al. |

OTHER PUBLICATIONS

U.S. Appl. No. 16/290,547 U.S. Pat. No. 11,276,397, filed Mar. 1, 2019, Narrowband Direction of Arrival for Full Band Beamformer.
"International Application Serial No. PCT US2022 011983, International Search Report dated Apr. 26, 2022", 4 pgs.
"International Application Serial No. PCT US2022 011983, Written Opinion dated Apr. 26, 2022", 6 pgs.
"U.S. Appl. No. 17/148,297, Response filed Aug. 31, 2022 to Non Final Office Action dated May 31, 2022", 8 pgs.

* cited by examiner

GENERAL STEERABLE BEAMFORMING SYSTEM

FIG. 3

FREQUENCY DOMAIN STEERABLE BROADBAND BEAMFORMER STRUCTURE

NARROWBAND DIRECTION OF ARRIVAL FOR FULL BAND BEAMFORMER

BACKGROUND

Field

This technology as disclosed herein relates generally to hands free voice interface systems and, more particularly, to use of direction of arrival (DOA) beamforming to improve performance.

Background

A hands-free voice user interface system requires a discernable signal to be streamed for recognition. One way to improve the speech signal is to estimate where the talker is and steer a beam to it. To localize the talker to a location, a direction of arrival estimator (DOA) algorithm is typically used. The voice user interface system typically has 2 or more microphones to be able to apply a DOA algorithm. However, the raw microphone signal could be contaminated with noise and would require additional and computationally expensive pre-processing before it is discernable and can be reliably used for the DOA algorithm. The preprocessing for the DOA algorithm can be quite computationally expensive. A method and system is needed that reduces the computational complexity and lowers cost. Such a technology would have relevant utility to many voice controlled products such as Google Home®, Amazon Echo®, Apple HomePod®, etc. Current methodologies typically either accepts a noisy DOA estimation or a full-band preprocessing is used that incurs an expensive increase due to computational processing.

Examples include hands-free in-vehicle communication systems, conference telephony systems and automatic speech recording for conferences and voice activated systems. In such systems, the ultimate aim is to allow the user to be completely free from wearing or holding any part of the communication equipment in order to use them, and yet have a signal reception quality similar to that as if the microphone is close to the user's mouth such as in traditional systems. The main challenge in these situations is that such signal acquisition needs to be done without constraining the movement of the user. This leads to time-varying signal models due to the dynamics of the user as the signal source. Furthermore, as the distance between the user and the microphones increases, the ratio between the speech strength and the strength of the background noise and other interferences decreases, causing additional challenges to the problem. In addition to improved reception quality of the acoustic signal of interest, another challenge is to have location based selectivity in the aforementioned applications. The idea is that the system is required to respond only to the signal of interest originating from some active region that is not necessarily fixed in that it can be moving, thus allowing a different set of processing algorithms to be performed on signals originating from other regions, if necessary. As an example, a voice command acquisition system in a smart television may have an active area only at the front of the television, where viewers normally sit. This can prevent any false voice command being issued from non-viewers at the sides and back of the television set. However, the area of the source of the signal may not be fixed and can be moving.

A better system and/or method is needed for improving hands-free voice user interface systems.

SUMMARY

The technology as disclosed herein includes a system and method for improving the performance of a hands-free voice user interface systems while minimizing the computational complexity without sacrificing performance. Specifically, when estimating the location of the talker for the purpose of steering a directional beam in the direction of the active talker, a hands-free voice user interface system requires a discernable signal to be streamed to the cloud for recognition. One way to improve the speech signal is to estimate where the talker is and steer a beam in the direction of the active talker. To locate the talker to a localized position, a direction of arrival estimator (DOA) algorithm is used. For one implementation of the technology the voice user interface system utilizes two (2) or more microphones to be able to apply a DOA algorithm. However, the raw microphone signal could be contaminated with noise and would require additional and computationally expensive pre-processing before it can be reliably used for the DOA algorithm. The preprocessing for the DOA algorithm can be quite computationally expensive. The technology as disclosed and claimed herein reduces this computation by converting the signal to the frequency domain, applying preprocessing to some select frequency bands, calculating the speaker location based on the select frequency band, and feeding the DOA calculation to a full-band Beamformer to localize to the speaker. The technology as disclosed and claimed herein is relevant to many voice controlled products such as Google Home®, Amazon Echo®, Apple HomePod®, and other like voice controlled devices. The technology as disclosed and claimed herein improves over traditional methodology that either accepts a noisy DOA estimation or they use a full-band preprocessing and incur an expensive computational hit in their processing. With the current technology as disclosed and claimed herein with its various implementations, the DOA estimation is cleaned up without suffering a drastic computational cost.

For one implementation of the technology as disclosed and claimed herein, the system has a selected frequency band that is between 600 Hz to 2 kHz and the system utilizes 6 microphone inputs. Select Frequency bands are extracted. The Frequency Domain Based pre-processing was 6 Frequency Domain Based Acoustic Echo Cancellers (AEC) operating within those selected bands for each input microphone signal. This is then fed into the DOA algorithm to control where the Frequency Domain Beamformer should point. For one implementation, the beamformer operates at the bandwidth (DC to 8 kHz). With this implementation, the CPU computation is reduced by roughly a factor 5× between doing the band-limited pre-proprocessing/DOA vs full band pre-processing/DOA. There is a significant reduction in the CPU load with the technology as disclosed and claimed and a significant voice recognition improvement for the active talker.

The system and method as disclosed and claimed herein is Narrowband Direction of Arrival for Full Band Beamformer technology. For one implementation of the technology as disclosed and claimed herein, a far field voice user interface system with multiple microphones is utilized. One of the tasks the system and method as disclosed is when a trigger word is detected, the system will estimate the direction of arrival of the trigger word and point an acoustic beamformer to that direction. This task has to be done while the device is playing music or in the presence of other distractors. One problem that the present technology helps to resolve is that most pre-processing algorithms are computationally expensive. For one implementation the pre-processing including acoustic echo cancellation which is done for each microphone on the device, increasing the computational load even more.

One innovation or improvement that the technology provides is to apply the preprocessing, in the frequency domain, to only a subset of the frequency bands. This narrowband pre-processed signal will then be used to estimate the direction of arrival. The resultant direction is then fed to the acoustic beamformer, which operates on the full band microphone signals. For one implementation, the technology utilizes frequency bands corresponding to about approximately between 500 Hz and 2000 Hz. These frequency bands were chosen because they cover most of the energy of speech signals. These narrow band signals are then each pre-processed with an Acoustic Echo Canceler before processed by the direction of arrival estimator. The frequency bands need not be contiguous. If the system is to be designed to future reduce the processing load, the system could be designed to use every other frequency band between 500 Hz and 2000 Hz. If the system is designed for a signal of interest that is not speech, the system can be designed for a different frequency band range that more matches the target signal. This technique makes no assumptions on the type of beamformer used as various designs can be utilized without departing from the scope of the invention as disclosed and claimed herein. It makes no assumption on the algorithm used for direction of arrival estimation. If the direction of arrival estimation is time-domain based, the narrowband processed signal can be converted to the time-domain via a synthesis filter-bank.

The features, functions, and advantages that have been discussed can be achieved independently in various implementations or may be combined in yet other implementations further details of which can be seen with reference to the following description and drawings.

These and other advantageous features of the present technology as disclosed will be in part apparent and in part pointed out herein below.

BRIEF DESCRIPTION OF THE DRAWINGS

For a better understanding of the present technology as disclosed, reference may be made to the accompanying drawings in which.

While the technology as disclosed is susceptible to various modifications and alternative forms, specific implementations thereof are shown by way of example in the drawings and will herein be described in detail. It should be understood, however, that the drawings and detailed description presented herein are not intended to limit the disclosure to the particular implementations as disclosed, but on the contrary, the intention is to cover all modifications, equivalents, and alternatives falling within the scope of the present technology as disclosed and as defined by the appended claims.

DESCRIPTION

According to the implementation(s) of the present technology as disclosed, various views are illustrated in FIG. 1-6 and like reference numerals are being used consistently throughout to refer to like and corresponding parts of the technology for all of the various views and figures of the drawing. Also, please note that the first digit(s) of the reference number for a given item or part of the technology should correspond to the Fig. number in which the item or part is first identified. Reference in the specification to "one embodiment" or "an embodiment"; "one implementation" or "an implementation" means that a particular feature, structure, or characteristic described in connection with the embodiment or implementation is included in at least one embodiment or implementation of the invention. The appearances of the phrase "in one embodiment" or "in one implementation" in various places in the specification are not necessarily all referring to the same embodiment or the same implementation, nor are separate or alternative embodiments or implementations mutually exclusive of other embodiments or implementations.

One implementation of the present technology as disclosed comprising FFT, and DOA functions integrated with a Steerable beamforming functions teaches a novel apparatus and method for a hands-free voice user interface system.

Figure 2:
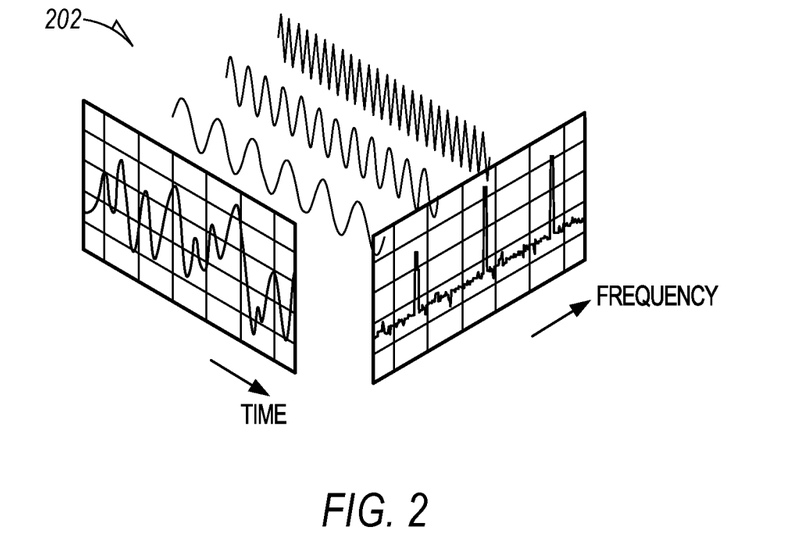
FIG. 2 is an illustration of an FFT function operating on a signal.

For one implementation of the present technology, a voice user interface system utilizes two (2) or more microphones for receiving an audible voice signal from a talker. The signal received through the microphones is preprocessed through a Fast Fourier Transform (FFT) function to transform to a frequency domain signal. A FFT function is an algorithm that is implemented by an electronic circuit and/or is implemented by software that samples a signal over a period of time (or space) and divides it into its frequency components. These components are single sinusoidal oscillations at distinct frequencies each with their own amplitude and phase. This transformation is illustrated in FIG. 2. Over the time period measured in FIG. 2 for illustration purposes, the signal contains 3 distinct dominant frequencies.

An FFT algorithm computes the Discrete Fourier Transform (DFT) of a sequence, which is a complex-valued function of frequency. The interval at which the DTFT is sampled is the reciprocal of the duration of the input sequence. An inverse DFT is a Fourier series, using the DTFT samples as coefficients of complex sinusoids at the corresponding DTFT frequencies. It has the same sample-values as the original input sequence. The DFT is therefore said to be a frequency domain representation of the original input sequence. If the original sequence spans all the non-zero values of a function, its DTFT is continuous (and periodic), and the DFT provides discrete samples of one cycle. If the original sequence is one cycle of a periodic function, the DFT provides all the non-zero values of one DTFT cycle, or the FFT algorithm computes its inverse (IFFT). Fourier analysis converts a signal from its original domain to a representation in the frequency domain and vice versa. An FFT rapidly computes such transformations by factorizing the DFT matrix into a product of sparse (mostly zero) factors. As a result, it manages to reduce the complexity of computing the DFT from $O(N^2)$, which arises if one simply applies the definition of DFT, to $O(N \log N)$, where N is the data size. There are many different FFT algorithms based on a wide range of published theories, from simple complex-number arithmetic to group theory and number theory.

The DFT is obtained by decomposing a sequence of values into components of different frequencies. A Fourier transform operation is useful in many fields but computing it directly from the definition is often too slow to be practical. An FFT is a way to compute the same result more quickly by computing the DFT of N points using the definition, which takes $O(N^2)$ arithmetical operations, while an FFT can compute the same DFT in only $O(N \log N)$ operations. The difference in speed can be enormous, especially for long data sets where N may be in the thousands or millions. In practice, the computation time can be reduced by several orders of magnitude in such cases, and the improvement is roughly proportional to N/log N. This huge improvement made the calculation of the DFT practical; FFTs are of great importance to a wide variety of applications, from digital signal processing and solving partial differential equations to algorithms for quick multiplication of large integers.

Some of the better known FFT algorithms depend upon the factorization of N, but there are FFTs with $O(N \log N)$ complexity for all N, even for prime N. Many FFT algorithms only depend on the fact that $c^{-2\pi i/N}$ is an N-th primitive root of unity, and thus can be applied to analogous transforms over any finite field, such as number-theoretic transforms. Since the inverse DFT is the same as the DFT, but with the opposite sign in the exponent and a 1/N factor, any FFT algorithm can easily be adapted for it. An FFT computes the DFT and produces exactly the same result as evaluating the DFT definition directly; the most important difference is that an FFT is much faster.

Let $x_0, \ldots, x_{N-1}$ be complex numbers. The DFT is defined by the formula $$X_k = \sum_{n=0}^{N-1} (x_n e^{-i2\pi kn/N}) k = 0, \ldots, N-1$$

Evaluating this definition directly requires $O(N^2)$ operations: there are N outputs $X_i$, and each output requires a sum of N terms. An FFT is any method to compute the same results in $O(N \log N)$ operations. FFT algorithms generally have $\Theta(N \log N)$ operations. There are various algorithms to implement FFT including various genres of recursive functions that break down a DFT of any composite size $N=N_1 N_2$ into many smaller DFTs of sizes $N_1$ and $N_2$, along with $O(N)$ multiplications by complex roots of unity. Various other types of algorithms can also be utilized without department from the scope of the invention as disclosed and claimed herein.

However, as discussed, the raw microphone signal could be contaminated with noise and would typically require additional and computationally expensive pre-processing before it can be reliably used for the DOA algorithm. The preprocessing for the DOA algorithm can be quite computationally expensive. The technology as disclosed and claimed herein reduces this computation by converting the signal to the frequency domain using an FFT function, and applying preprocessing to some select frequency band extracted from the frequency domain transformed signal rather than processing a full band signal, calculating the talker location based on the select frequency band, and feeding the DOA calculation to a full-band Beamformer to localize to the speaker. The technology as disclosed and claimed herein is relevant to many voice controlled products. The extraction of a select frequency band can be preprocessed and input to a direction of arrival estimation function whose output can be input to the beamforming function.

Extraction of a select "frequency band", can be accomplished by applying a "band pass filter". The intensity as a function of frequency can then be seen by the amplitude of the filtered waveform. In frequency domain processing, for one implementation, extraction is accomplished by processing the frequency samples within the selected frequency band (see FIG. 6). For one implementation of the technology, the frequency domain based preprocessing of a selected frequency band includes, Acoustic Echo Cancellation (AEC) to improve hands-free communication by allowing talkers to converse in a natural manner without having to speak directly into a microphone. Some high-end telepresence systems already achieve life-like communication, but they are computationally demanding and prohibitively expensive. Whereas for one implementation of the present technology the Acoustic Echo Canceller (AEC) function only processing select bands of the audio signal thereby maintaining low computational complexity and reasonable memory consumption. For one implementation a full-duplex Acoustic Echo Cancellation (AEC) is utilized. Echoes occur because there is an acoustic path between the and the microphone array. The reference signal, x(n), is rendered by a talker in the room. The microphone signal, y(n), contains the talker's speech signal, s(n), along with background noise, b(n) and the disturbances created by the unwanted echo, d(n). The AEC predicts the echo, d(n), and subtracts it from the microphone signal to create e(n), which is typically further processed by residual echo suppression, noise reduction, and other speech enhancement algorithms. The preprocessed signal can then be feed to the direction of arrival function.

Direction of arrival (DOA) denotes the direction from which usually a propagating wave arrives at a point, where usually a set of sensors are located. These set of sensors forms what is called a sensor array, whereby in one implementation of the present technology, the sensor array is two or more microphones. The microphones for one implementation is configured in an in-line configuration, however, other geometric configurations of the microphone array can be utilized. The DOA function operating on select bands is integrated with the associated technique of beamforming which is estimating the signal to be from a given direction. Array signal processing captures the spatial information of the received signal, which can be useful in acoustic source localization or rejecting signals based on their spatial locations. Beamformers that can be steered around the azimuth plane while maintaining their frequency invariant response as well as the shape of their spatial main-beam. The system can estimate the direction of the talker relative to the array where the sound source is located. Various techniques for calculating the direction of arrival for select frequency bands can be utilized, such as Angle of Arrival (AoA), Time Difference of Arrival (TDOA), Frequency Difference of Arrival (FDOA), or other similar associated techniques. There is a one-to-one relationship between the direction of a signal and the associated received steering vector. It should therefore be possible to invert the relationship and estimate the direction of a signal from the received signals. This allows the direction of arrival (DOA) estimation problem to be treated as equivalent to spectral estimation. For yet another implementation preprocessing of the speech signal from the talker methods of processing the spectrum and segmenting the speech signal for stable speech recognition in the presence of frequency distortions can be performed.

They are based on a procedure of linear filtering of the logarithmic spectrum envelope.

The technology as disclosed and claimed herein is a viable solution to the above problems when integrating FFT, frequency band selection, AEC, and DOA with is beamforming, which provides spatially selective signal processing capabilities. Beamforming is an array signal processing technique where received signals, which are sampled both temporally and spatially at several sensors, are processed at the same time. Due to the spatial sampling of the received signals, the sampled data contains the spatial information regarding the received signals, in addition to their temporal information. Hence, spatial-temporal selective signal processing are possible. In this context, a pass region or main-beam is normally placed at a particular direction (or active region) in order to acquire the speech signal originating from that direction while rejecting unwanted signals coming from other directions, thus effectively provides spatially dependent characteristics. In addition, the main-beam of the beamformer can be made steerable rather than being fixed, either manually or automatically using source tracking algorithms to cater for hands free audio voice recognition applications. Fixed beamformers, though simple, have only a fixed response. They are limited therefore to applications where the signal source is fixed. If the signal source moves to a new position, then the fixed beamformers will need to be redesigned to cater for such a change. In contrast, steerable beamformers are able to steer their main-beams on-the-fly, without the need to redesign their weights. This steering capability offers dynamic beamforming which is extremely useful in applications that involve moving sources.

In addition to the above noted integrated functions, beamforming techniques can be integrated to work side by side with other complex multi-channel algorithms such as distant speech recognition, speech separation, speaker tracking and localization in order to further improve their performances. Ideally the resulting beamformers should have unity magnitude response with constant phase delay in the look direction (pass region) and zero response in the stop region to completely suppress signals coming from other directions. For one implementation of the technology as disclosed and claimed, the beamformers should include the following: 1.) electronically steerable main-beam, without requiring any mechanical movement of the physical array, 2.) simple steering function of the main-beam without needing to redesign the beamformer weights for different steering directions, 3.) steering invariant spatial-temporal response, i.e. only the direction of the main-beam changes with the steering direction. Other properties include, main-beam width and side lobes that remain invariant for different steering directions, frequency invariant response throughout the frequency range of interest and for all steering directions, robust to errors and perturbation, such as sensor mismatch and sensor position errors, and ability to operate for both near field and far field source models.

The sensors, or microphone array of two or more microphones, can either be placed arbitrarily or follow a known geometry shape. In general, array geometries can be categorized into three main categories, namely one dimensional (1D), two dimensional (2D) and three dimensional (3D) arrays. 1D arrays include placing sensors in a line. Its variants include uniform or non-uniform spaced array element, and broadside or end reconfiguration type. 2D arrays consist of placing sensors on a plane, which can either be along the perimeter of or fill up an enclosed area. Some commonly used 2D arrays include planar, circular and multi-ring concentric circular array patterns. In the case of 3D arrays, the sensors can be placed on the surface of 3D solids, or they can be placed on frames to fill up the volume of 3D solids, such as cylinder or sphere. The choice of array patterns depends heavily on the target applications. In beamforming or spatial filtering, sensors placed in space play the role of spatially sampling the received wave. Therefore, ideally the smallest distance between adjacent sensors at most is equal to half the smallest wavelength in order to avoid spatial aliasing. The signal received at a sensor (or receiver) can be phase delayed and attenuated by its propagation response (also known as array element response). A beamformer structure describes how filtering can be applied to the received signal at each sensor in order to achieve a desired overall response.

Figure 1:
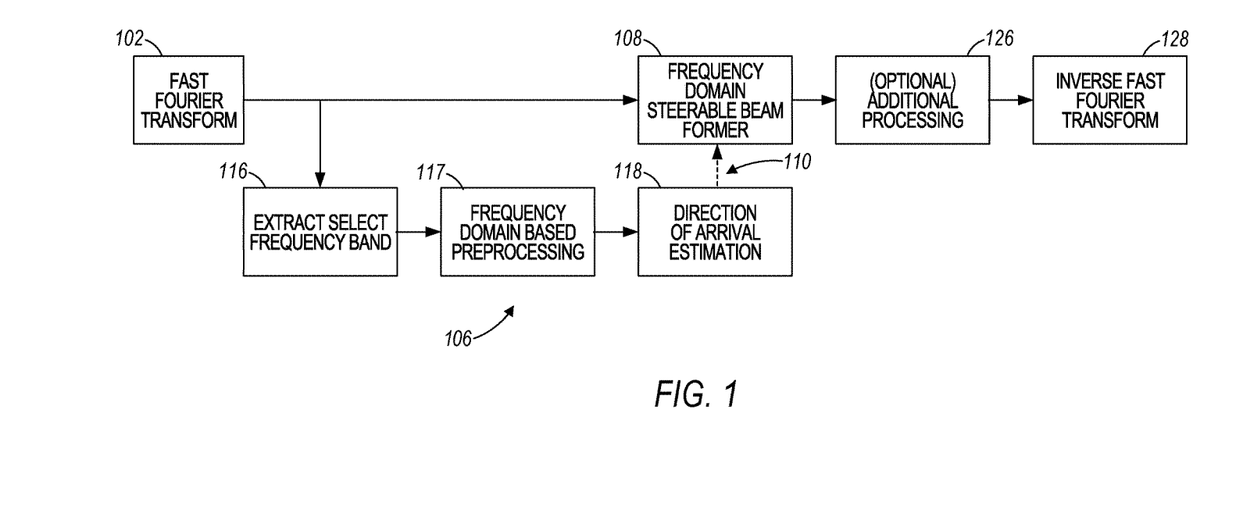
FIG. 1 is an illustration of a narrowband direction of arrival for full band beamformer.

The details of the technology as disclosed and various implementations can be better understood by referring to the figures of the drawing. Referring to FIG. 1, an illustration of a narrowband direction of arrival for full band beamformer is illustrated for a hands-free voice user interface system comprising. For one implementation of the technology as disclosed and claimed herein, an array of two or more sensors each having a sensor output is communicably coupled to an FFT module 102 having a signal processing function configured to perform an FFT operation to Fast Fourier Transform signals transmitted from the sensor output to a frequency domain signal output 104 that is communicably coupled to a direction of arrival preprocessor module 106 and a steerable beamformer module 108, where the direction of arrival preprocessor module is configured to perform an DOA operation to produce a direction of arrival estimation output 110 communicably coupled to the steerable beamformer module 112, and where the steerable beamformer module 112 is configure to perform a beamformer operation to produce a beamformer output 114.

As discussed herein, the technology as disclosed and claimed herein reduces computation by converting the signal to the frequency domain using an FFT function 102, and applying preprocessing to some select frequency band extracted 116 from the frequency domain transformed signal, calculating the speaker location based on the select frequency band, and feeding the DOA calculation 110 to a full-band Beamformer to localize to the talker. The technology as disclosed and claimed herein is relevant to many voice controlled products. The extraction 116 of a select frequency band can be preprocessed 117 and input to a direction of arrival estimation function 118 whose output 110 can be input to the beamforming function.

Extraction 116 of a select "frequency band, can be accomplished by applying a "band pass filter". The intensity as a function of frequency can then be seen by the amplitude of the filtered waveform. Frequency domain based preprocessing 117 of a selected frequency band includes and Acoustic Echo Cancellation (AEC) are utilized to improve hands-free communication by allowing talkers to converse in a natural manner without having to speak directly into a microphone. Some high-end telepresence systems already achieve life-like communication, but they are computationally demanding and prohibitively expensive. The Acoustic Echo Canceller (AEC) function processes select band audio signals thereby maintaining low computational complexity and reasonable memory consumption The steerable beamformer output 114 for one implementation can undergo further post-processing 126 and an inverse Fourier transform function 128.

Referring to FIG. 2, an FFT function operating on a signal is illustrated, which is an algorithm that is implemented by an electronic circuit and/or implemented by software that samples a signal over a period of time (or space) and divides it into its frequency components. These components 202 are single sinusoidal oscillations at distinct frequencies each with their own amplitude and phase. This transformation is illustrated in FIG. 2. Over the time period measured in FIG. 2 for illustration purposes, the signal contains 3 distinct dominant frequencies.

Figure 3:
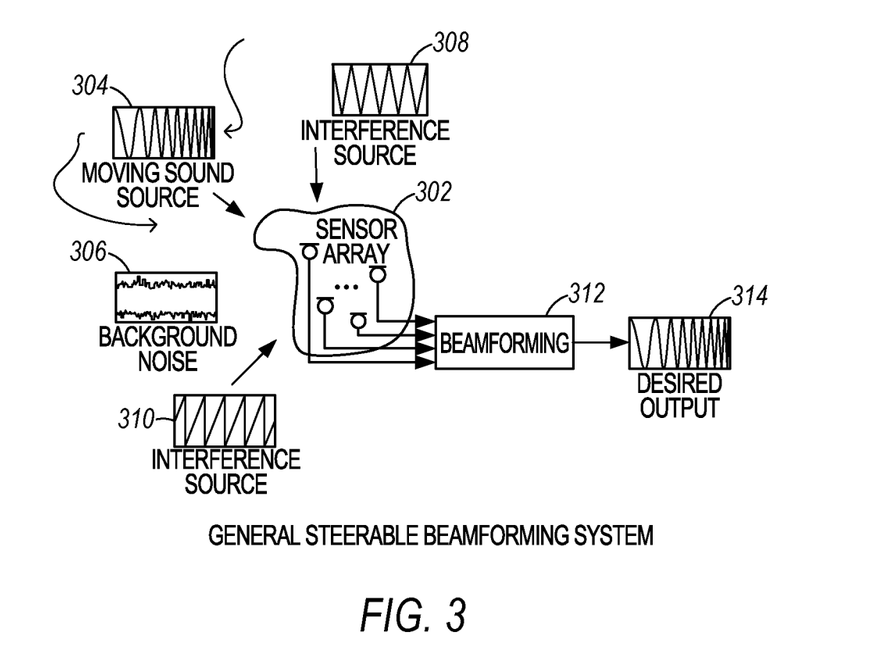
FIG. 3 is an illustration of a general steerable beamforming system.

Referring to FIG. 3, a general steerable beamforming system is illustrated. A sensor array 302 is illustrated receiving audible signals from a moving sound source 304 such as a talker. There is also background noise 306 being emitted in the environment with the talker. There may also be various interference sources 308 and 310. The steerable beamformer function 312 is illustrated producing the desired signal 314.

Figure 4:
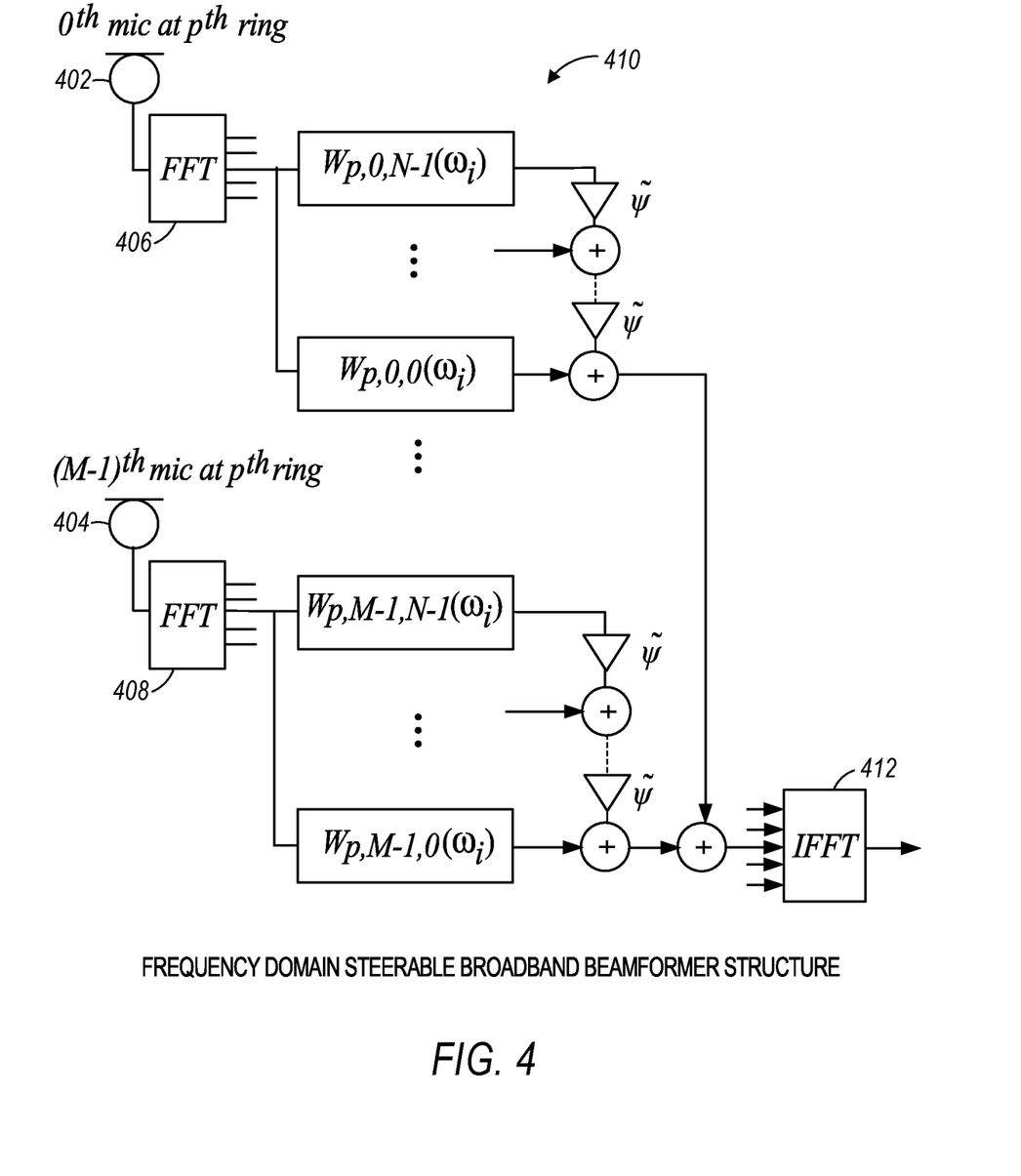
FIG. 4 is an illustration of a frequency domain steerable broadband beam former module.
Figure 5:
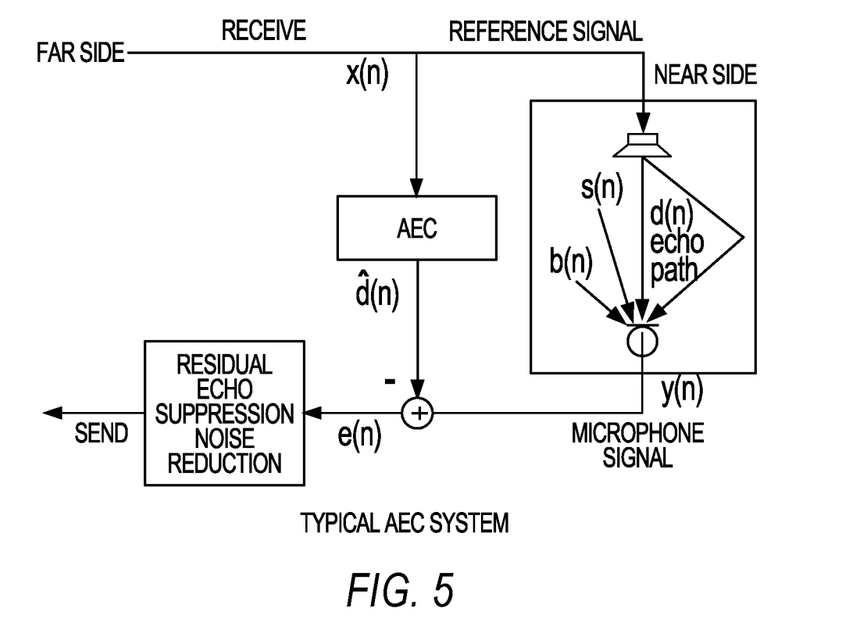
FIG. 5 is an illustration of a typical preprocessor audio echo cancellation system.
Figure 6:
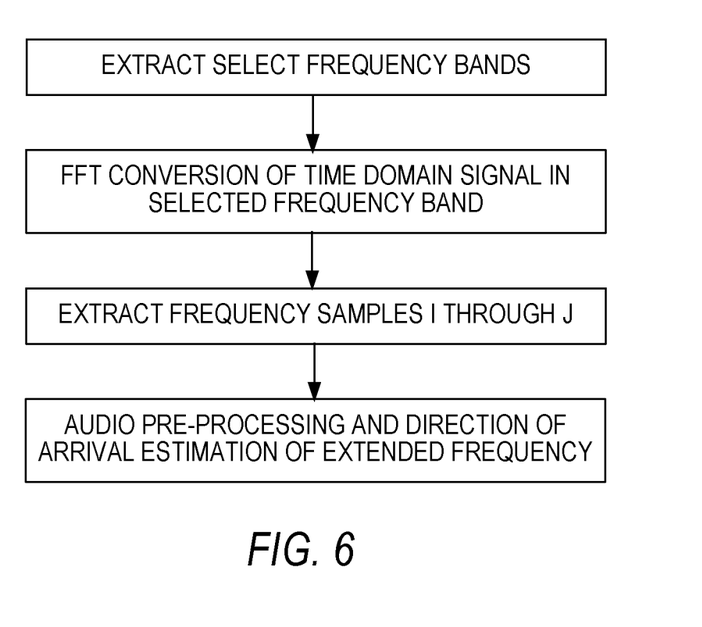
FIG. 6 is an illustration of extraction module for extracting select frequency bands.

Referring to FIG. 4, a frequency domain steerable broadband beamformer module is illustrated. The signals from the sensors 402 and 404 are illustrated as being transformed by the FFT modules 406 and 408. The beamformer stage 410 is illustrated, which provides an output that is inverse Fourier transformed 412. FIG. 5 illustrates a typical preprocessor audio echo cancellation system. FIG. 6 illustrates the extraction process for extracting select frequency bands for further preprocessing. FFT converts a time-domain signal in the frame to N frequency samples. Frequency samples i through j are extracted and used for audio pre-processing and DOA estimation. FIG. 1 illustrates a signal process flow.

The various implementations and examples shown above illustrate a method and system for a hands-free voice user interface system. A user of the present method and system may choose any of the above implementations, or an equivalent thereof, depending upon the desired application. In this regard, it is recognized that various forms of the subject hands-free voice user interface method and system could be utilized without departing from the scope of the present technology and various implementations as disclosed.

As is evident from the foregoing description, certain aspects of the present implementation are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present implementation(s). Accordingly, the specification and drawings are to be regarded in an illustrative rather than a restrictive sense.

Certain systems, apparatus, applications or processes are described herein as including a number of modules including a Fast Fourier Transform (FFT) module, a frequency band extraction module, an audio echo cancellation module, a direction of arrival module and a steerable beamformer module. A module may be a unit of distinct functionality that may be presented in software, hardware, or combinations thereof. When the functionality of a module is performed in any part through software, the module includes a computer-readable medium. The modules may be regarded as being communicatively coupled. The inventive subject matter may be represented in a variety of different implementations of which there are many possible permutations.

The methods described herein do not have to be executed in the order described, or in any particular order. Moreover, various activities described with respect to the methods identified herein can be executed in serial or parallel fashion. For example, the beamformer function and the DOA functions can operate in parallel. In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

In an example implementation, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine or computing device. Further, while only a single machine is illustrated, the term "machine" shall also be taken to include any collection of machines that individually or jointly execute a set (or multiple sets) of instructions to perform any one or more of the methodologies discussed herein. For example, a machine potentially includes a hands-free voice user interface system including a microphone array and a signal processing unit.

The example computer system and client computers can include a processor (e.g., a central processing unit (CPU) a graphics processing unit (GPU) or both), a main memory and a static memory, which communicate with each other via a bus. One implementation of the present invention includes a computing system having a processor programmed with an FFT algorithm, a DOA algorithm, and a beamformer algorithm. The computer system may further include a video/graphical display unit (e.g., a liquid crystal display (LCD) or a cathode ray tube (CRT)). The computer system and client computing devices can also include an alphanumeric input device (e.g., a keyboard), a cursor control device (e.g., a mouse), a drive unit, a signal generation device (e.g., a speaker) and a network interface device.

The drive unit includes a computer-readable medium on which is stored one or more sets of instructions (e.g., software) embodying any one or more of the methodologies or systems described herein. The software may also reside, completely or at least partially, within the main memory and/or within the processor during execution thereof by the computer system, the main memory and the processor also constituting computer-readable media. The software may further be transmitted or received over a network via the network interface device. Software may include an FFT algorithm, a DOA algorithm, and a beamformer algorithm.

The term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present implementation. The term "computer-readable medium" shall accordingly be taken to include, but not be limited to, solid-state memories, and optical media, and magnetic media.

The various examples shown above illustrate a narrow band direction of arrival full band beamformer system. A user of the present technology as disclosed may choose any of the above implementations, or an equivalent thereof, depending upon the desired application. In this regard, it is recognized that various forms of the subject voice recognition narrow band direction of arrival full band beamformer system could be utilized without departing from the scope of the present invention.

As is evident from the foregoing description, certain aspects of the present technology as disclosed are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present technology as disclosed and claimed.

Other aspects, objects and advantages of the present technology as disclosed can be obtained from a study of the drawings, the disclosure and the appended claims.

What is claimed is:

1. A method of audio beamforming, the method comprising:
   receiving a plurality of audio signals from a microphone array;
   converting the plurality of audio signals into a plurality of frequency-domain audio signals, each of the plurality of frequency-domain audio signals including a predetermined number of frequency bands;
   selecting a subset of the predetermined number of frequency bands for each of the plurality of frequency-domain audio signals;
   performing a direction of arrival analysis on the subset of the predetermined number of frequency bands to determine a direction of arrival value for the plurality of audio signals received from the microphone array; and
   performing beamforming on all of the plurality of frequency-domain audio signals using the direction of arrival value.

2. The method of claim 1, wherein the subset of the predetermined number of frequency bands is between 600 Hz and 2 kHz.

3. The method of claim 1, wherein performing beamforming on the plurality of frequency-domain audio signals comprises:
   performing beamforming on the plurality of frequency-domain audio signals in a bandwidth of DC to a Nyquist Frequency of an operated sampling rate.

4. The method of claim 3, wherein the Nyquist Frequency is approximately 8 kHz.

5. The method of claim 1, where the subset of the predetermined number of frequency bands are not contiguous bands.

6. The method of claim 5, where the subset of the predetermined number of frequency bands are alternating bands.

7. The method of claim 1, further comprising:
   performing frequency-domain based acoustic echo cancellation on each subset of the predetermined number of frequency bands for each of the plurality of frequency-domain audio signals.

8. An audio voice user interface system comprising:
   a microphone array for providing a plurality of audio signals;
   an FFT module to convert the plurality of audio signals into a plurality of frequency-domain audio signals, each of the plurality of frequency-domain audio signals including a predetermined number of frequency bands;
   a preprocessing module to perform acoustic echo canceling on a subset of the predetermined number of frequency bands for each of the plurality of frequency-domain audio signals;
   a direction of arrival analysis module to perform a direction of arrival analysis on the subset of the predetermined number of frequency bands to determine a direction of arrival value for the plurality of audio signals received from the microphone array; and
   a beamformer to beamform on all of the plurality of frequency-domain audio signals using the direction of arrival value.

9. The system of claim 8, wherein the subset of the predetermined number of frequency bands is between 600 Hz and 2 kHz.

10. The system of claim 8, wherein the beamformer performs beamforming on the plurality of frequency-domain audio signals in a bandwidth of DC to a Nyquist Frequency of an operated sampling rate.

11. The system of claim 10, wherein the Nyquist Frequency is approximately 8 kHz.

12. The system of claim 8, where the subset of the predetermined number of frequency bands are not contiguous bands.

13. A non-transitory computer-readable storage medium, the computer-readable storage medium including instructions that when executed by a computer, cause the computer to perform operations for audio beamforming, the operations comprising:
   receiving a plurality of audio signals from a microphone array;
   converting the plurality of audio signals into a plurality of frequency-domain audio signals, each of the plurality of frequency-domain audio signals including a predetermined number of frequency bands;
   selecting a subset of the predetermined number of frequency bands for each of the plurality of frequency-domain audio signals;
   performing a direction of arrival analysis on the subset of the predetermined number of frequency bands to determine a direction of arrival value for the plurality of audio signals received from the microphone array; and
   performing beamforming on all of the plurality of frequency-domain audio signals using the direction of arrival value.

14. The computer-readable storage medium of claim 13, wherein the subset of the predetermined number of frequency bands is between 600 Hz and 2 kHz.

15. The computer-readable storage medium of claim 13, wherein performing beamforming on the plurality of frequency-domain audio signals comprises:
   performing beamforming on the plurality of frequency-domain audio signals in a bandwidth of DC to a Nyquist Frequency of an operated sampling rate.

16. The computer-readable storage medium of claim 13, where the subset of the predetermined number of frequency bands are not contiguous bands.

17. The computer-readable storage medium of claim 13, wherein the operations further comprise:
   performing frequency-domain based acoustic echo cancellation on each subset of the predetermined number of frequency bands for each of the plurality of frequency-domain audio signals.

* * * * *